Feb. 9, 1926.                                              1,572,471
                       H. L. DOOLITTLE
                     PENSTOCK STRUCTURE
                     Filed May 7, 1923           2 Sheets-Sheet 2
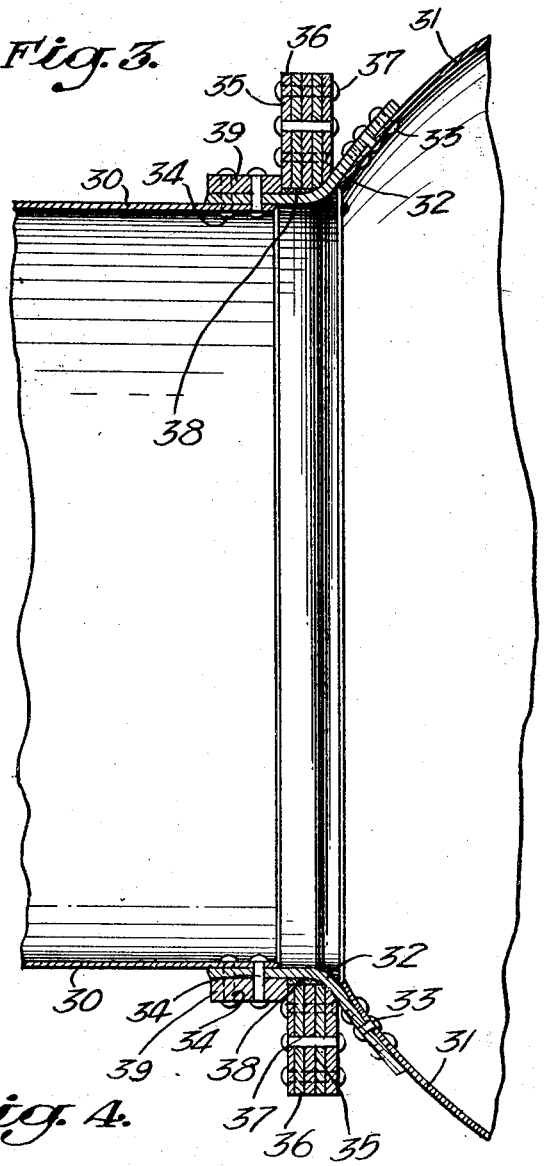
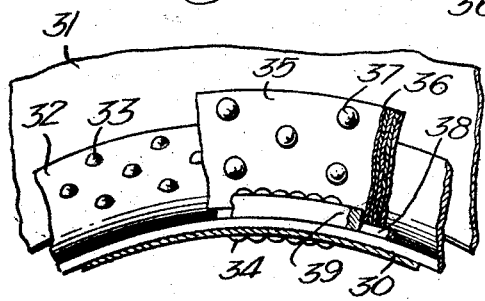
INVENTOR:
HAROLD L. DOOLITTLE,
BY
Graham + Davis
   ATTORNEYS.

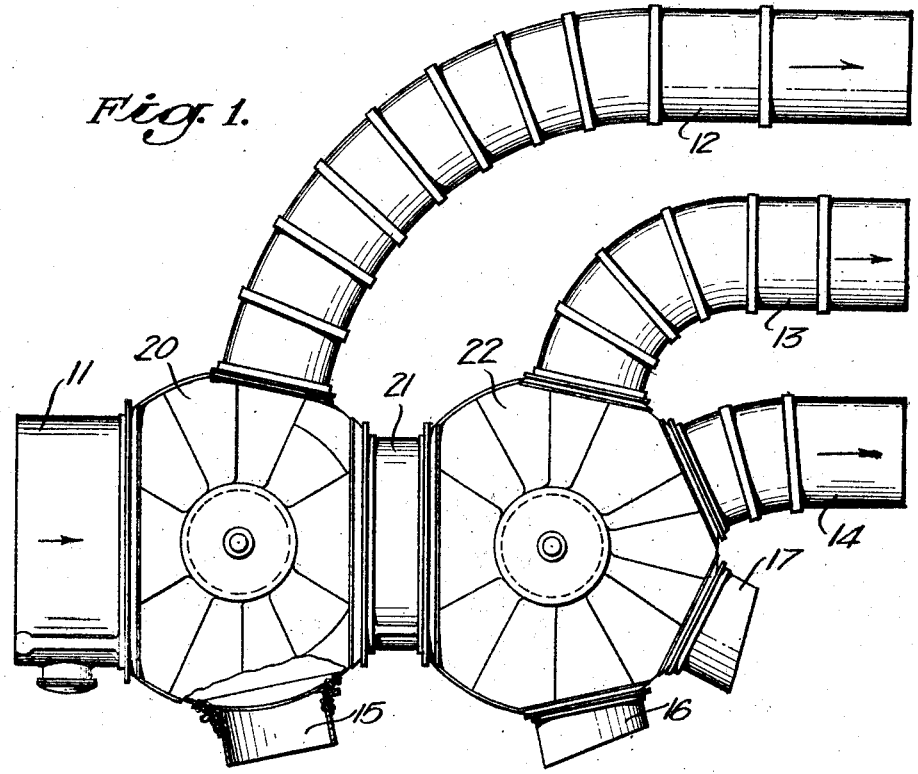
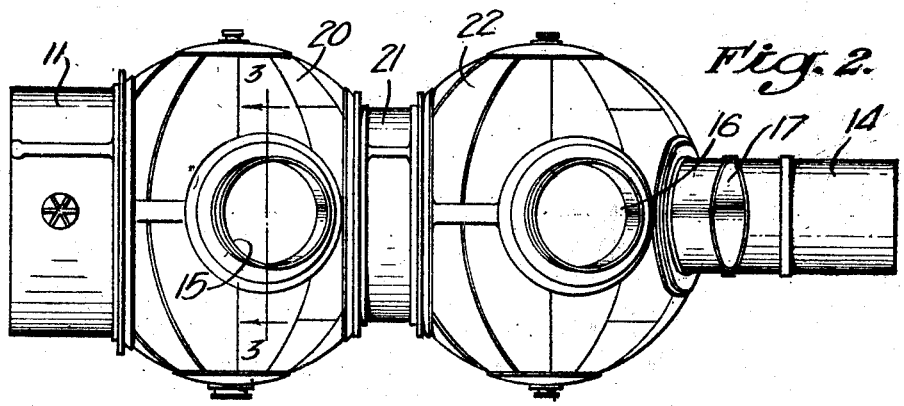

Patented Feb. 9, 1926.

1,572,471

UNITED STATES PATENT OFFICE.

HAROLD L. DOOLITTLE, OF LOS ANGELES, CALIFORNIA.

PENSTOCK STRUCTURE.

Application filed May 7, 1923. Serial No. 637,157.

*To all whom it may concern:*

Be it known that I, HAROLD L. DOOLITTLE, a citizen of the United States, residing at Los Angeles, in the county of Los Angeles and State of California, have invented a new and useful Penstock Structure, of which the following is a specification.

My invention relates to hydraulic engineering and more particularly to penstock structures used in large hydraulic power plants. It is common practice in many parts of the country to bring water under considerable pressure down into a power house in which hydraulic turbines are placed. This water is commonly conducted to the power house through large pipes formed of sheet steel, which are welded or riveted, there being one or more of these large supply pipes leading into the power house. In the power house it is desirable for economic reasons to provide a plurality of hydraulic turbines and it is desirable to divide each of the larger supply pipes into a plurality of distribution pipes, each leading to a separate turbine.

The problem of making sheet metal structures which will stand the heavy pressures used in high-head hydraulic plants is a difficult one. The sheet metal used has a high tensile strength, but the form of structure must be such that the material is substantially all in tension.

It is an object of my invention to provide a penstock structure which can be fabricated conveniently from sheet metal plates and which will stand a very high internal pressure.

Further objects and advantages will be made evident hereinafter.

Referring to the drawings which are for illustrative purposes only:

Fig. 1 is a plan view of an assembled structure.

Fig. 2 is a side elevation of same.

Fig. 3 is an enlarged view of one of the joints employed.

Fig. 4 is an elevation of a portion of such joint.

In the form of the invention shown, a cylindrical supply pipe 11 is employed. This pipe may be from 3 feet to 20 feet in diameter and is connected to the source of water supply. Distribution pipes 12, 13, 14, 15, 16, and 17 are also employed, these pipes leading to the individual hydraulic turbines.

In the form of the invention illustrated, a single supply pipe 11 is provided and six distribution pipes are provided. The supply pipe 11 is connected into a spherical chamber 20, which is formed of sheet metal welded or riveted, the axis of the pipe 11 being preferably coincident with the center of the spherical chamber 20. The distribution pipes 12 and 15 are connected into the side of the chamber 20 in such a manner that their axes at the point of joinder with the chamber are coincident with the center of the chamber. The chamber 20 is connected through an intermediate pipe 21 with the second chamber 22, the axis of the pipe 21 passing through the centers of the chambers 20 and 22, and the axes of the pipes 13, 14, 16, and 17 at their point of joinder with the chamber also passing through the center of the chamber 22.

It is a well-known fact that a cylindrical sheet metal member is a very economical structure to withstand bursting pressures, the material being wholly in tension. A spherical chamber may also be made of quite thin material and yet capable of standing considerable bursting pressure. By the use of the spherical chamber 20 we provide a means for taking off the pipe 12, for example, in any direction. The only point of weakness in such a structure comes at the joint between any of the cylindrical pipes, such for example as that indicated at 30 in Fig. 3, and the wall 31 of either of the spherical chambers 20 or 22. For the purpose of reinforcing the structure at this point, I have provided the means shown in Figs. 3 and 4, which consist of a formed plate 32 connected by rivets 33 to the spherical chamber 31, and by rivets 34 to the cylindrical pipe 30. At the point of juncture of the two surfaces I apply an annular ring 35, built up of individual plates 36 secured together by rivets 37. This ring is cut away to fit against plate 32, and lead or steel wool is caulked, as shown at 38, inside the ring which is finally secured in place by a second ring 39. By this form of construction I am able to produce a very strong joint, the ring 35 resisting the bursting strains at the point of juncture of the cylinder and the sphere.

I claim as my invention:

1. A penstock structure adapted to use in hydraulic power plants, comprising: a cylindrical sheet metal supply pipe; a spherical sheet metal chamber to which said supply pipe connects; and sheet metal distributing pipes extending from said chamber, said distributing pipes being arranged so that the axes thereof, if prolonged, would pass through the center of said chamber.

2. A penstock structure composed of sheet metal and comprising: a cylindrical supply pipe; a plurality of cylindrical distributing pipes; a chamber between said supply pipe and said distributing pipes; and reinforcing rings applied to said structure at the intersection of the walls of said chamber and the walls of each pipe.

3. A penstock structure as in claim 2 in which said reinforcing rings comprise: a plate secured to the walls of said chamber and to the walls of the joining pipe; and a tension ring encircling said plate and reinforcing same against bursting stresses.

4. A penstock structure comprising: a substantially spherical sheet metal chamber of very great diameter relative to the thickness of the sheet metal walls; a sheet metal supply pipe for said chamber; and sheet metal distributing pipes extending from said chamber.

5. A penstock structure comprising: a substantially spherical sheet metal chamber of very great diameter relative to the thickness of its sheet metal walls; a sheet metal supply pipe for said chamber, said pipe having a very great diameter relative to the thickness of its metal walls; and sheet metal distributing pipes extending radially from said chamber.

6. A penstock structure comprising: a plurality of substantially spherical chambers; an intermediate pipe connecting each pair of said chambers, said intermediate pipe having a considerable diameter relative to the diameter of the chambers; a supply pipe connected to one of said chambers, said supply pipe having a diameter greater than that of the intermediate pipe and only slightly less than that of the chambers; and distributing pipes extending from said chambers, said distributing pipes having smaller diameters than that of the intermediate pipe, all of said penstock structure being composed of sheet metal, the proportion of the said structure being extremely great relative to the thickness of said metal walls.

7. A penstock structure as in claim 6, in which all of said pipes extend radially from said chambers.

8. A penstock structure as in claim 2 in which said reinforcing rings comprise: a plate secured to the walls of said chamber and to the walls of said joining pipe; a tension ring encircling said plate and reinforcing same against bursting stresses; and a securing ring for retaining said tension ring in place.

In testimony whereof, I have hereunto set my hand at Los Angeles, California, this 30th day of April 1923.

HAROLD L. DOOLITTLE.